(12) United States Patent
Woodtli et al.

(10) Patent No.: US 9,760,086 B2
(45) Date of Patent: Sep. 12, 2017

(54) METHOD FOR STORING AND/OR ORDER-PICKING PRODUCT UNITS

(75) Inventors: Werner Woodtli, Lenzburg (CH); Tom Jarle Dehkes, Oslo (NO); Cornelius Van Der Zandt, Kontich (BE)

(73) Assignee: Swisslog AG, Buchs/Aarau (CH)

( * ) Notice: Subject to any disclaimer, the term of this patent is extended or adjusted under 35 U.S.C. 154(b) by 778 days.

(21) Appl. No.: 14/118,153

(22) PCT Filed: May 14, 2012

(86) PCT No.: PCT/EP2012/058893
§ 371 (c)(1),
(2), (4) Date: Nov. 15, 2013

(87) PCT Pub. No.: WO2012/156355
PCT Pub. Date: Nov. 22, 2012

(65) Prior Publication Data
US 2014/0088748 A1    Mar. 27, 2014

(30) Foreign Application Priority Data
May 17, 2011   (DE) .................. 10 2011 050 437

(51) Int. Cl.
*G06F 7/00* (2006.01)
*G05B 19/418* (2006.01)
(Continued)

(52) U.S. Cl.
CPC ....... *G05B 19/4189* (2013.01); *B65G 1/0492* (2013.01); *B65G 1/1378* (2013.01); *B65G 47/5104* (2013.01); *B65G 2209/08* (2013.01)

(58) Field of Classification Search
None
See application file for complete search history.

(56) References Cited

U.S. PATENT DOCUMENTS 5,320,478 A * 6/1994 Gonsowski ............ B65G 47/66
                                                198/374
5,899,659 A * 5/1999 Beilsmith .............. B65G 59/08
                                                198/594
(Continued)

FOREIGN PATENT DOCUMENTS

DE          10313576 A1 * 10/2004  .......... B65G 1/1378
DE          10313576 B     10/2004
(Continued)

*Primary Examiner* — Yolanda Cumbess
(74) *Attorney, Agent, or Firm* — Bachman & LaPointe, P.C.

(57) ABSTRACT

A method for storing and/or order-picking product units in a storage and/or order-picking installation (P1), in which incoming transporting units are stored on an interim basis in a store, are supplied, if required, to a depalletizing station (4) and are individually stored on an interim basis in a buffer store (6) for product units. Thereafter, branch-specific mixed pallets (16) are automatically set up, supplied to the delivery zone (11) and loaded onto lorries. The system solution is distinguished, in particular, in that it can dispense entirely with transporting aids such as shelves for product units, rows of product units or for entire layers of transporting units. The transport shuttles (8) provided and the rail installation (8a) perform largely the functions of transporting aids, storage means and conveying systems.

21 Claims, 7 Drawing Sheets

(51) Int. Cl.
*B65G 1/04* (2006.01)
*B65G 1/137* (2006.01)
*B65G 47/51* (2006.01)

(56) References Cited

U.S. PATENT DOCUMENTS

| | | | |
|---|---|---|---|
| 6,552,213 B1* | 4/2003 | Deshpande | C07F 7/1892 |
| | | | 556/440 |
| 6,652,213 B1* | 11/2003 | Mitchell | B65G 1/0492 |
| | | | 414/279 |
| 7,047,710 B2 | 5/2006 | Winkler | |
| 8,556,567 B2 | 10/2013 | Schafer | |
| 2009/0074545 A1* | 3/2009 | Lert, Jr. | B65G 1/0492 |
| | | | 414/276 |
| 2012/0039693 A1* | 2/2012 | Benedict | E04H 6/225 |
| | | | 414/231 |

FOREIGN PATENT DOCUMENTS

| | | |
|---|---|---|
| FR | 2915977 A | 11/2008 |
| WO | 2005077789 A | 8/2005 |
| WO | 2007134841 A1 | 11/2007 |

* cited by examiner

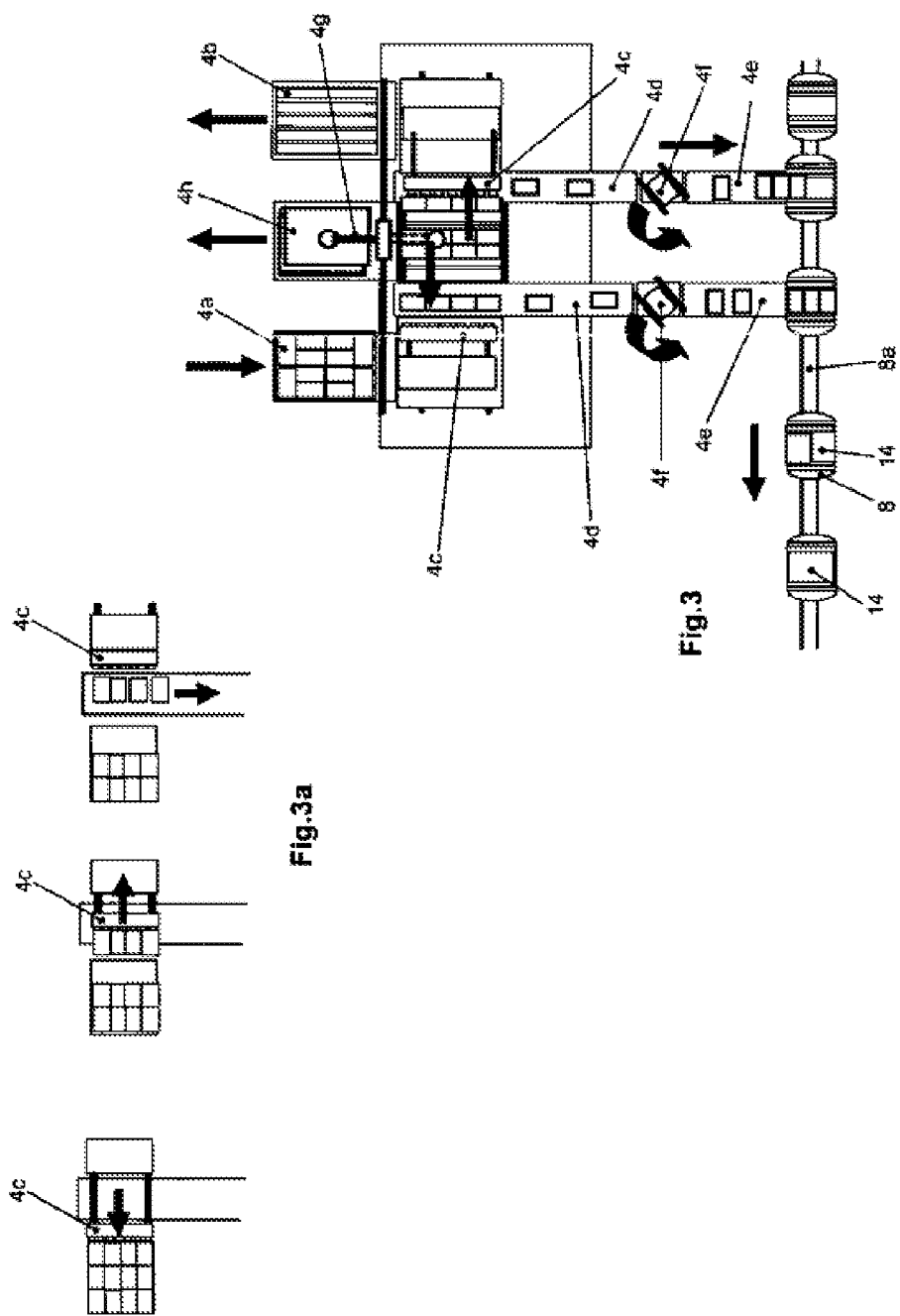

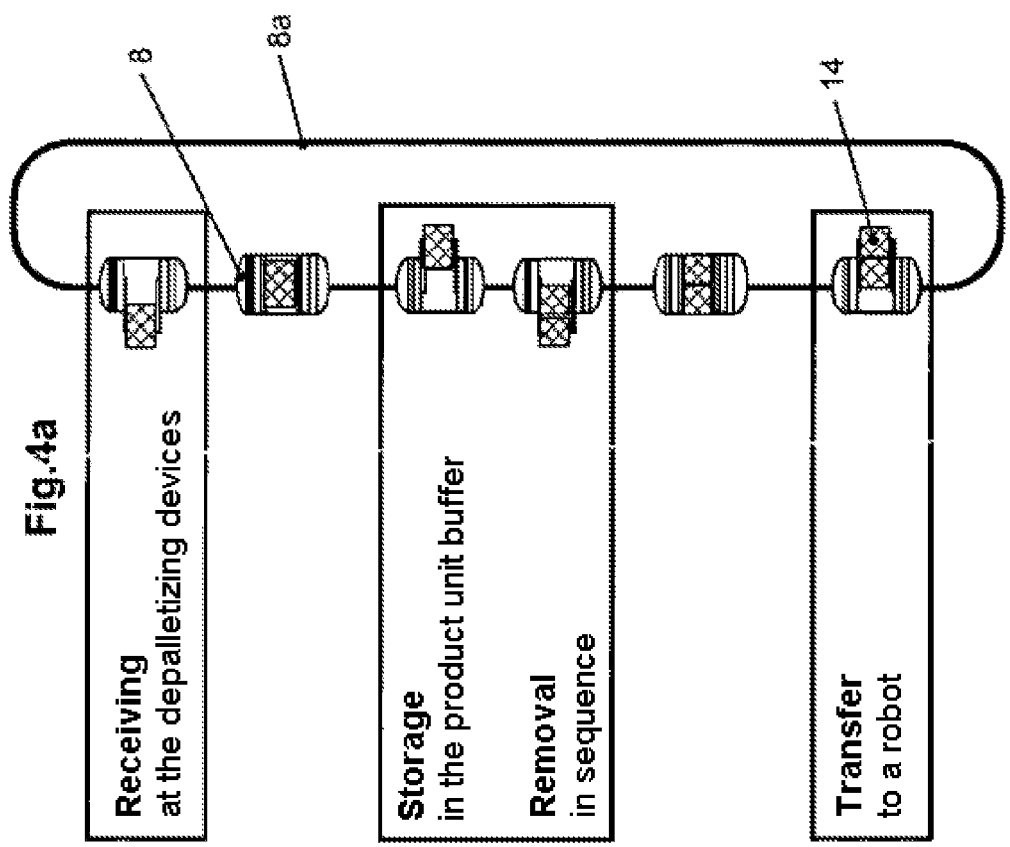
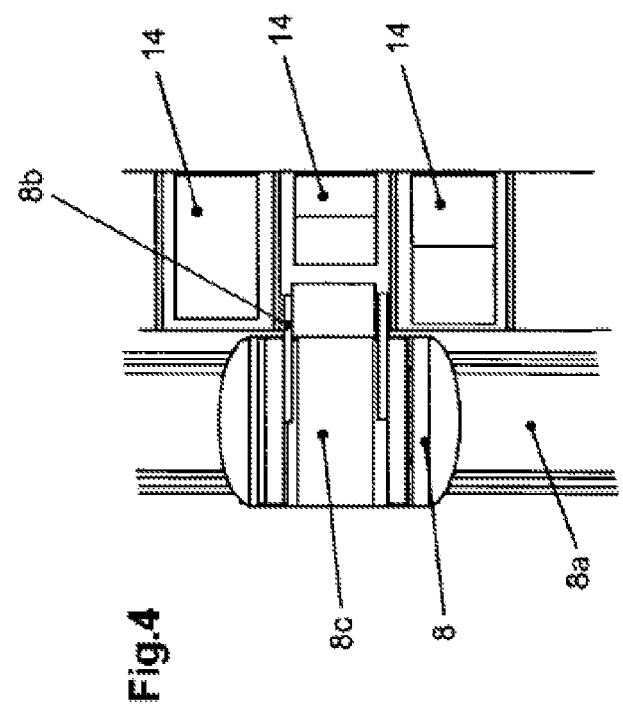

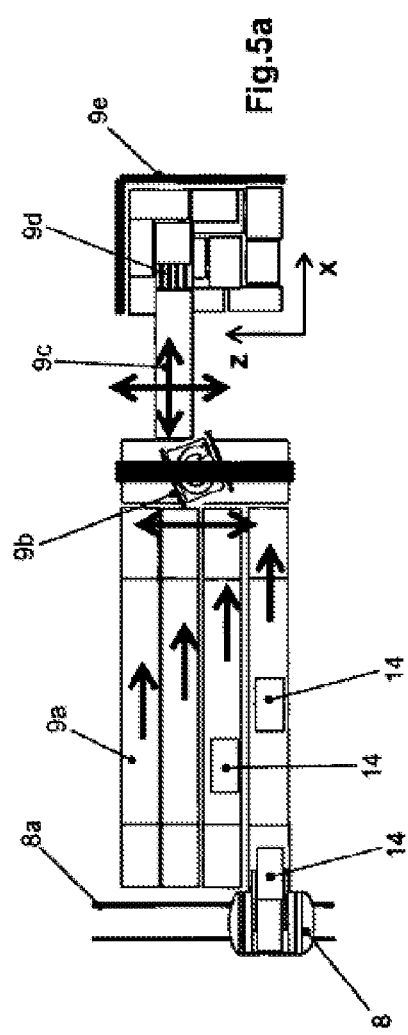
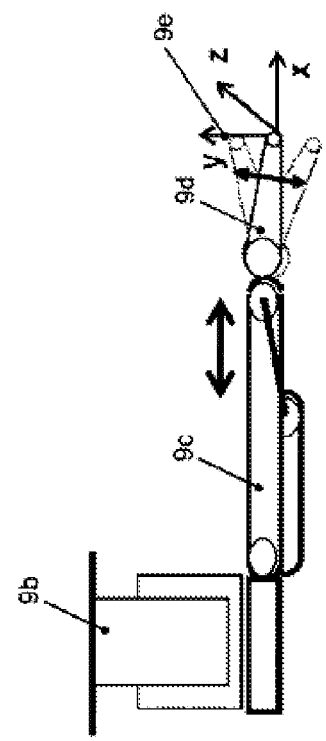

METHOD FOR STORING AND/OR ORDER-PICKING PRODUCT UNITS

BACKGROUND OF THE INVENTION

The invention relates to a method for storing and/or order-picking products and/or product units and/or product unit groups in a storage and/or order-picking installation with a buffer store.

Many documents describe individual elements for the storage and/or order-picking of products in a corresponding installation. For example, WO 2005/077789 A1 is concerned with an automatic warehouse and an automatic vehicle in order to bring products into said automatic warehouse. A lift unit which is arranged on the front side of the warehouse is shown here. The vehicles are also described in more detail. A reference to an overall system with depalletizing device and palletizing device cannot be identified.

Complete logistics systems for products and/or product units are ever more important nowadays. Development leads to ever greater automation in order to relieve personnel from monotonous and unhealthy work, in order to save costs and time and in order to increase the economic efficiency of the systems. Certain product units of identical or unidentical type are typically introduced into the logistics system, which takes place on any transport units. In a logistics system, said transport units are stored, taken apart, sorted and, depending on client requirements, assembled again to form new transport units.

A logistics system of this type is described, for example, in DE 103 13 576 B4. Product units are stored there in a high-bay warehouse and are removed therefrom. Said handling is carried out by automated and computer-controlled storage and retrieval vehicles. The high-bay warehouse is a conventional pallet warehouse, to which a tray warehouse is connected via automated conveyor technology. Product units to be order-picked are stored individually on trays in the tray warehouse. Each tray is therefore loaded with a single packing unit. Said individual packing units are then also handled individually, for which purpose a large amount of time is required, and extensive equipping with apparatuses and a large amount of space are necessary.

By contrast, WO 2007/134841 A1 describes an order-picking installation with a high-bay warehouse, at least one tray warehouse, at least one packing station and at least one dispatch station. In this case, packing units which form an, in particular, complete pallet layer are depalletized in layers from a pallet onto a correspondingly dimensioned tray. Said tray with the entire pallet layer is then brought into a tray warehouse. Depending on the order, corresponding trays are then retrieved and new transport units assembled from the individual product units. This means that a relatively large unit has to be moved and stored, for which purpose considerable space is necessary. Furthermore, at many stations, product carriers which are not completely empty have to be handled and moved to and fro, which signifies a considerable effort. In order to increase the probability of complete emptying of a tray, a plurality of picking orders are combined (batch), which has the consequence that the product units have to be sorted again later into individual orders by complicated technology and sequences.

Furthermore, US 2009/0074545 A1 is concerned with a materials handling system for selecting and combining products in an outgoing container. In this case, autonomous transport vehicles which travel on a rail network are provided. Said vehicles are used to bring the same products from a loading station to a destination station where the products are assembled in an exit container. The travel of each vehicle along the rail network is computer-controlled, and each vehicle contains devices for the automatic loading and unloading of the products.

The object of the present invention is to provide a method and an installation of the above type, of which product units can be handled and dealt with further in a rapid, automated, space-saving and cost-effective manner.

SUMMARY OF THE INVENTION

In order to achieve the object, product, product unit and/or product unit group is loaded onto the transport shuttle in a loading device, which follows a depalletizing device, with the aid of a load pick-up means of a transport shuttle and is transported on a shuttle loop to a buffer store where the loaded transport shuttle is raised or lowered to different levels by a lift unit, which is placed upstream of the buffer store, the products and/or product units and/or product unit group are moved in the buffer store by at least one transport shuttle away from the lift unit to a reversing unit and back to the lift unit and remain at least temporarily on the transport shuttle.

The object is furthermore achieved by a method for storing and/or order-picking products and/or product units and/or product unit groups in a storage and/or order-picking installation with a buffer store, wherein a loaded transport shuttle is raised or lowered to different levels by a lift unit which is placed upstream of the buffer store, the products and/or product units and/or product unit group are moved in the buffer store by at least one transport shuttle away from the lift unit to a reversing unit and back to the lift unit and remain at least temporarily on the transport shuttle, the products, product units and/or product unit groups are retrieved from the buffer store by the transport shuttle and are supplied via the lift unit and a transport rail or a shuttle loop to a palletizing device.

The achievement of the object is based on a transport shuttle which receives the task of transport within the system, but at the same time also the function of a tray as carrier of the product units.

The invention has the advantage over the prior art that trays are not required as carriers, transport and storage aids of the product units. Conveying devices for transporting, stacking, unstacking, buffering and temporarily storing trays are therefore no longer required either. The transport shuttle and a transport rail installation completely take over these tasks.

In a method according to the invention for storing and/or order-picking products and/or product units in a storage and/or order-picking installation with a buffer store, the products and/or product units are moved at least in the buffer store by at least one transport shuttle. The products and/or product units preferably remain here on the transport shuttle at least in the buffer store. In a preferred method, the products and/or product units are pushed and/or pulled, preferably in rows, by a depalletizing beam in a depalletizing device.

In a preferred method, a releasable connection between the depalletizing bar and a product and/or product unit is at least temporarily produced with the aid of a suction cup. Such a releasable connection is particularly preferably produced by a plurality of suction cups.

In a preferred method, the product and/or product unit is raised by the depalletizing bar.

In a particularly preferred method, in the depalletizing device, a wedge-shaped receiving belt is pushed under the product and/or product unit.

A particularly advantageous method is characterized in that the product and/or product unit is pushed and/or pulled onto a carry-away belt by the depalletizing bar.

In a preferred method, after depalletization, the product and/or product unit is checked on the transport belt by a vision system for correctness, intactness and orientation, and is then supplied to the rotation unit and/or rotated in the rotation unit.

A further vision system continuously checks the depalletizing operation, identifies the layer pattern and passes on the information to a control system of the depalletizing unit. Said system preferably also identifies whether an intermediate layer is present. The control system will correspondingly trigger the removal of the intermediate layer before the next depalletizing operation is triggered.

In the adjoining collecting belt, groups of product units are formed if there is space for a plurality of units on the transport shuttle.

In a method according to the invention, the product and/or product unit group is loaded onto the transport shuttle by means of a load pick-up means, preferably a pair of telescopic arms, of the transport shuttle. The load pick-up means is capable of moving an individual product unit or a plurality of product units simultaneously.

It is particularly advantageous if the product and/or product unit is loaded in the loading device onto the transport shuttle with the aid of a conveyor belt or transport belt of the transport shuttle.

The products and/or product units are transported into the buffer store by the transport shuttle. In the one typical method, the products and/or product units are transported on a transport rail by the transport shuttle.

The products and/or product units are transported together with the transport shuttle in a lift unit. It is particularly advantageous in this case if the loaded transport shuttle is raised or lowered to different levels of a buffer store by the lift unit.

In a particularly advantageous method, a travel command of the transport shuttle is optimized such that, directly after a storage operation, the transport shuttle carries out a removal operation at a location in the storage and/or order-picking installation that is close to the storage-operation site. This has the advantage that the path which the transport shuttle has to cover in order to carry out its tasks is minimized, which, for example, results in a saving on time and energy.

In an advantageous method, the products and/or product units are retrieved from the buffer store by the transport shuttle and supplied via the transport rail to a palletizing device. It is particularly advantageous if the products and/or product units are supplied together with the transport shuttle via the transport rail and/or the lift unit to a palletizing device.

In high-capacity systems, a plurality of transport paths will have access to a palletizing device. The system capacity can therefore be multiplied in accordance with the number of transport paths.

The sequence of product units is preferably maintained in a plurality of stages: by the optimum selection of the time at which a transport shuttle receives a removal order, by the correct sequence in which the lifts retrieve the shuttles from the warehouse levels, by the correct time at which a shuttle enters the transport loop and by the selection of the next supply belt from which the rotary/pushing unit receives the product unit and supplies the latter to the telescopic belt.

As a supplement, the supply belt can be equipped with an additional sequencing unit. This has the advantage that the products and/or product units do not necessarily have to be loaded onto pallets in the sequence in which they arrive at the palletizing device, but rather can first of all take up a short waiting position in the sequence store.

In typical methods, the products and/or product units are directly supplied to the palletizing device via the rotary/pushing unit, without intermediate buffering in a sequence buffer. The task of the rotary/pushing unit resides in the products and/or product units being able to be rotated into a particularly advantageous position before palletization. To assist this task, the supply paths are preferably equipped with a vision system which once again checks the correctness, intactness and orientation of the product units.

In a typical method, the products and/or product units are deposited on the pallet with the aid of the telescopic belt and the top belt in accordance with the position precalculated by the warehouse management system.

The selected method permits a continuous flow from the supply belts onto the top belt of the palletizing device. The product units are preferably placed in rows, beginning from the opposite corner of the palletizing shaft, with the telescopic stroke moving synchronously with the telescopic belt and top belt. A further vision system continuously checks the correct sequence of the palletizing operation, records deviations from the precalculated sequence and passes on corresponding calibrating corrections to the control system of the palletizing unit.

A storage and/or order-picking installation according to the invention for storing and/or order-picking products and/or product units with a buffer store, a depalletizing device and a palletizing device typically comprises at least one transport shuttle for transporting the products and/or product units between the depalletizing device and the palletizing device. A storage and/or order-picking installation according to the invention preferably comprises at least 10, preferably at least 20, particularly preferably at least 50 transport shuttles. A storage and/or order-picking installation with at least 100 transport shuttles is particularly preferred.

In an advantageous embodiment, the storage and/or order-picking installation comprises at least one transport rail for guiding the transport shuttle. The storage and/or order-picking installation particularly preferably comprises a plurality of transport rails and/or a transport rail system.

A storage and/or order-picking installation according to the invention advantageously comprises a lift unit for raising and/or lowering the transport shuttle. The lift unit is typically arranged in the buffer store or in the immediate vicinity of the buffer store.

It is particularly advantageous if the storage and/or order-picking installation comprises a loading device for loading the transport shuttle with products and/or product units from a store.

In advantageous embodiments, the storage and/or order-picking installation comprises an unloading device for unloading the products and/or product units upstream of the palletizing device.

In advantageous embodiments, the depalletizing device comprises a depalletizing bar and a wedge-shaped receiving belt.

The depalletizing device advantageously comprises at least two, particularly preferably at least four depalletizing bars.

It is particularly advantageous if the depalletizing bar or at least one of the depalletizing bars comprises at least one suction cup, preferably at least two suction cups, particularly preferably a whole series of suction cups. The advantage of such a suction cup on the depalletizing bar resides in the fact that the depalletizing bar is set into position by the suction cup, with a product or a product unit at least temporarily entering into a connection, in particular a re-releasable connection. This is advantageous for the pushing and/or pulling of products and/or product units.

A particularly advantageous storage and/or order-picking installation is characterized in that the depalletizing device comprises a rotation unit for rotating the products and/or product units into certain positions.

In typical embodiments, the buffer store is suitable to be filled or emptied by the transport shuttle for the temporary storage of the products and/or product units. The buffer store is particularly preferably suitable for receiving the transport shuttle or a plurality of transport shuttles together with products and/or product units. The products and/or product units here typically remain on the transport shuttle. The transport shuttle is typically temporarily stored in the buffer store directly, i.e. typically without further trays or other auxiliary elements. This has the advantage that no further storage elements apart from the transport shuttles are required, and that loading the buffer store with, and unloading same of, products and/or product units is simplified and accelerated.

In a storage and/or order-picking installation according to the invention, the transport shuttle typically comprises a load pick-up means, preferably a pair of telescopic arms, for loading and/or unloading the transport shuttle.

The load pick-up means according to the invention with the pair of telescopic arms is capable of placing a plurality of product units on one storage place and of simultaneously removing the plurality of product units again. However, it is additionally capable also of removing or adding individual product units.

In particularly advantageous embodiments, the transport shuttle comprises a conveyor belt for assisting the loading and/or unloading of the transport shuttle and for centering the product unit on the shuttle. In addition, a parallel or simultaneous loading and unloading operation is possible, which increases the capacity of the shuttles and therefore the capacity of the system.

In a particularly advantageous storage and/or order-picking installation, the palletizing device comprises a rotary unit. This has the advantage that products and/or product units can be brought into a particularly advantageous position by the rotary unit before palletization.

In typical embodiments, the storage and/or order-picking installation comprises a pallet wrapper for wrapping ready loaded pallets, in particular ready loaded pallets on the palletizing device, containing a plurality of products and/or product units. The pallet wrapper is advantageously suitable for wrapping the pallets with film and/or tape and/or another material suitable for protecting or securing products and/or product units. The pallet wrapper is advantageously integrated into the palletizing device. As a result, the pallet which is palletized during the palletizing operation can be incrementally wrapped as it is being lowered.

A particularly advantageous storage and/or order-picking installation comprises a pallet flow for complete pallets, with the aid of which filled pallets can be typically conveyed directly from a store and/or an entry to an exit of the storage and/or order-picking installation.

A transport shuttle according to the invention for transporting products and/or product units in a storage and/or order-picking installation typically comprises a load pick-up means, preferably a telescopic arm, for loading and/or unloading the transport shuttle. Embodiments with at least one pair of telescopic arms are particularly preferred.

A particularly advantageous transport shuttle comprises at least one conveyor belt, preferably at least two conveyor belts, particularly preferably at least four conveyor belts, arranged in two pairs of belts, for loading and/or unloading the transport shuttle. A plurality of product units can preferably be stored as a group simultaneously in a storage compartment or removed therefrom. Solutions where, after storage as a group, individual product units can be removed or added, are particularly preferred.

BRIEF DESCRIPTION OF THE DRAWINGS

Further advantages, features and details of the invention emerge from the description below of preferred exemplary embodiments and with reference to the drawings, in which

FIG. 3 shows a top view of a detail, illustrated on an enlarged scale, from a storage and/or order-picking installation according to the invention, namely a device for depalletization;

FIG. 3a shows a top view of a detail, illustrated on an enlarged scale, from the device according to the invention for depalletization, namely a gripping unit for depalletizing the product units in rows;

FIG. 4 shows a basic illustration of a shuttle with a telescopic unit for directly gripping and depositing product units; wherein individual product units or groups of product units can be stored or removed;

FIG. 4a shows an illustration of a transport principle of the product units from receiving at the depalletizing devices to storage in the product unit buffer, removal in sequence to transfer to a robot at the palletizing devices;

FIG. 5a shows a top view of the palletizing device with supply belts, rotary/pushing unit, palletizing head and palletizing shaft;

FIG. 5b shows a side view of the palletizing head with telescopic belt, top belt and schematic illustration of the sensor arrangement.

DETAILED DESCRIPTION

Figure 1:
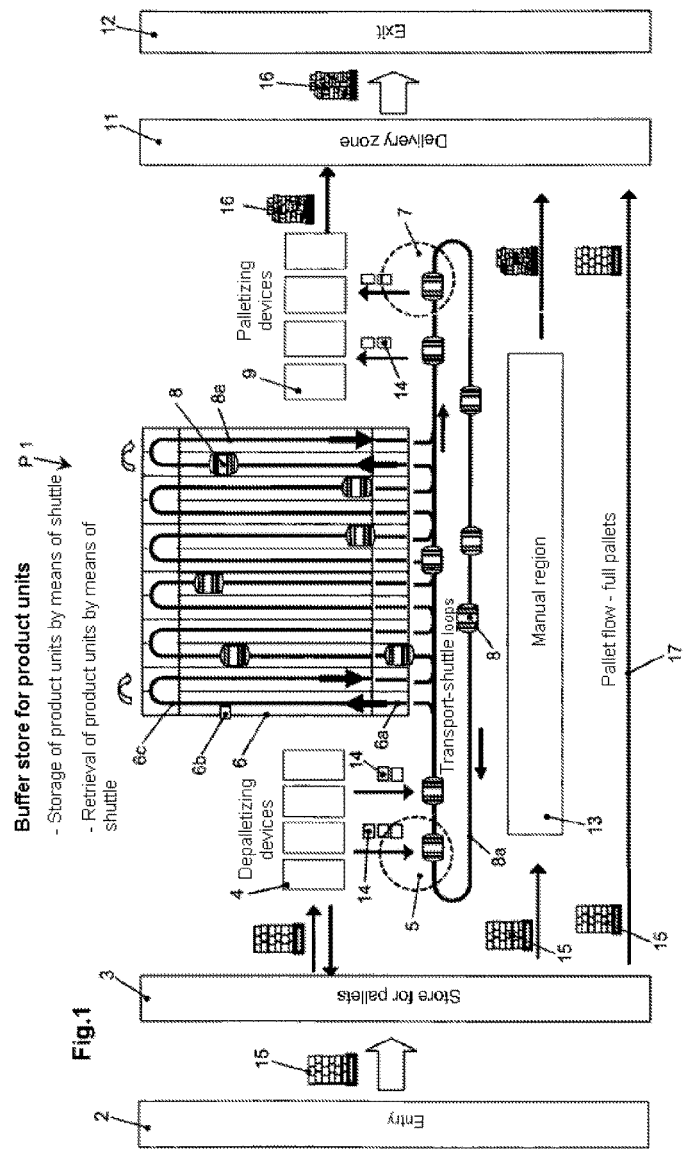
FIG. 1 shows a block diagram of a method according to the invention for storing and/or order-picking products in a storage and/or order-picking installation.

A storage/order-picking installation (P1) according to the invention has, according to FIG. 1, an entry (2). Product units (14) arrive at the entry (2) on transport units (15), for example pallets.

The entry (2) is followed by a store (3) for the transport units (15) which carry a plurality of products or product units (14), wherein said products or product units are temporarily stored there. This is, for example, a high-bay warehouse.

Figure 3B:
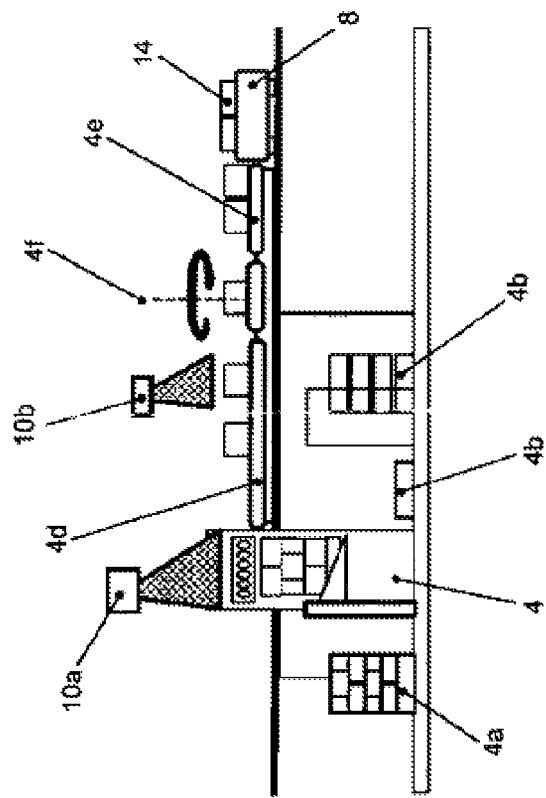
FIG. 3b shows a side view of a detail, illustrated on an enlarged scale, from the device according to the invention for depalletization.
Figure 3C:
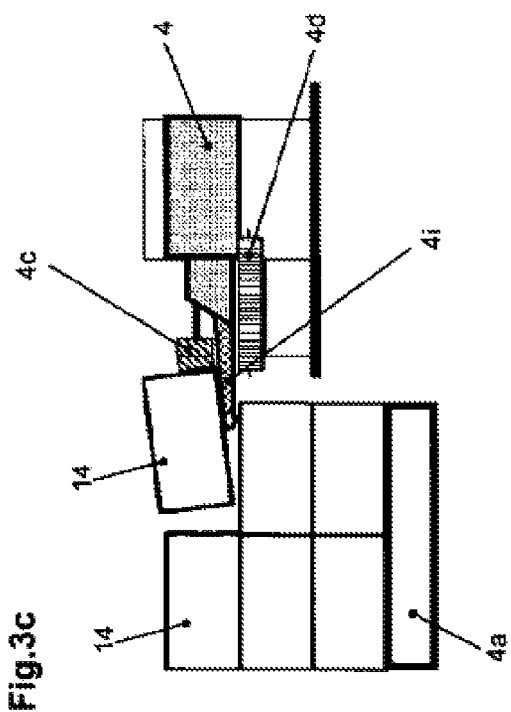
FIG. 3c shows a basic illustration of the gripping unit of the depalletizing device with suction unit and receiving belt.

The store (3) is connected to a depalletizing device (4) for separating the product units (14). The depalletization takes place in rows by means of two symmetrically arranged depalletizing bars (4c) (see FIG. 3) equipped with a double row of suction cups which slightly raise the individual product units (14), push under a slightly telescopic receiving belt (4i) (see FIG. 3c) and pull the product units onto the carry-away belt (4d).

The layer pattern of the pallet is continuously monitored with a vision system (10a) (FIG. 3b) and the depalletizing device is correspondingly optimally controlled. The same vision system (10a) likewise identifies intermediate layers. As a result, the removal device (4g) (FIG. 3) is activated for the intermediate layers and the intermediate layer is transferred into a waiting pallet with a lattice frame (4h).

The individual product units (14) are subsequently checked on the carry-away belt (4d) by the vision system (10b) for correctness, intactness and orientation, and are supplied to the rotation unit (4f) and rotated into the correct position.

Wherever possible, groups of product units are formed on a collecting belt (4e) and are supplied to a loading station (5) for transport shuttles (8).

The transport shuttle (8) takes on the active role during loading by receiving the product unit (14) or product unit group with the telescopic arm (8b) (see FIG. 4) and the supporting conveyor belt (8c).

The transport shuttles (8) then transport product units (14) or product unit groups individually on a transport rail (8a) via an upstream first lift unit (6a) into a buffer store (6). The product units (14) are temporarily stored in the buffer store (6) individually or in groups. No trays are necessary here, and the product units are directly placed onto the rack positions (6b) by the transport shuttle. Reversing devices (6c) (shown as 180° turns in the rail (8a) joining ends of adjacent aisles) are also provided in the buffer store.

The transport shuttle (8) is capable of storing individual product units or a plurality of product units jointly as a group. It is likewise capable of removing individual product units again from a group or of adding to an incomplete group.

The travel commands of the transport shuttle (8) are optimized to the extent that each transport shuttle (8) undertakes the storage in this aisle and on the level at which removal also takes place. The transport shuttle (8) can therefore undertake a double cycle with storage and subsequent removal at any time.

Figure 2:
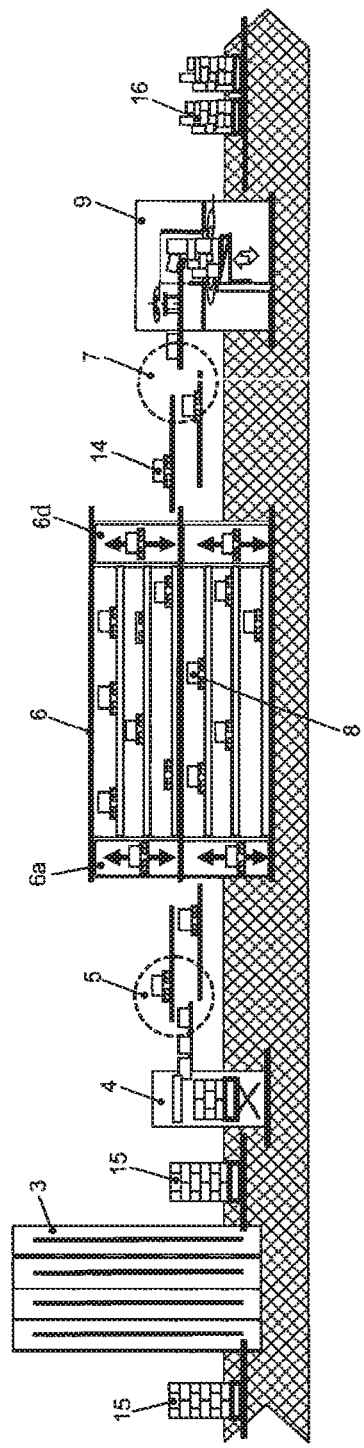
FIG. 2 shows a side view of a schematic detail, illustrated on an enlarged scale, from a storage and/or order-picking installation according to the invention.

The warehouse management system divides each store order into individual mixed pallets (16), determines the loading sequence of each mixed pallet (16) and allocates the latter to a palletizing station (9). The transport shuttles (8) then correspondingly receive travel commands in order to retrieve product units from the buffer store (6) and to supply them via a downstream second lift unit/station (6d) (FIG. 2) and the travel rails (8a) to the palletizing station (9). An unloading station (7) for the transport shuttle is provided there.

Figure 5:
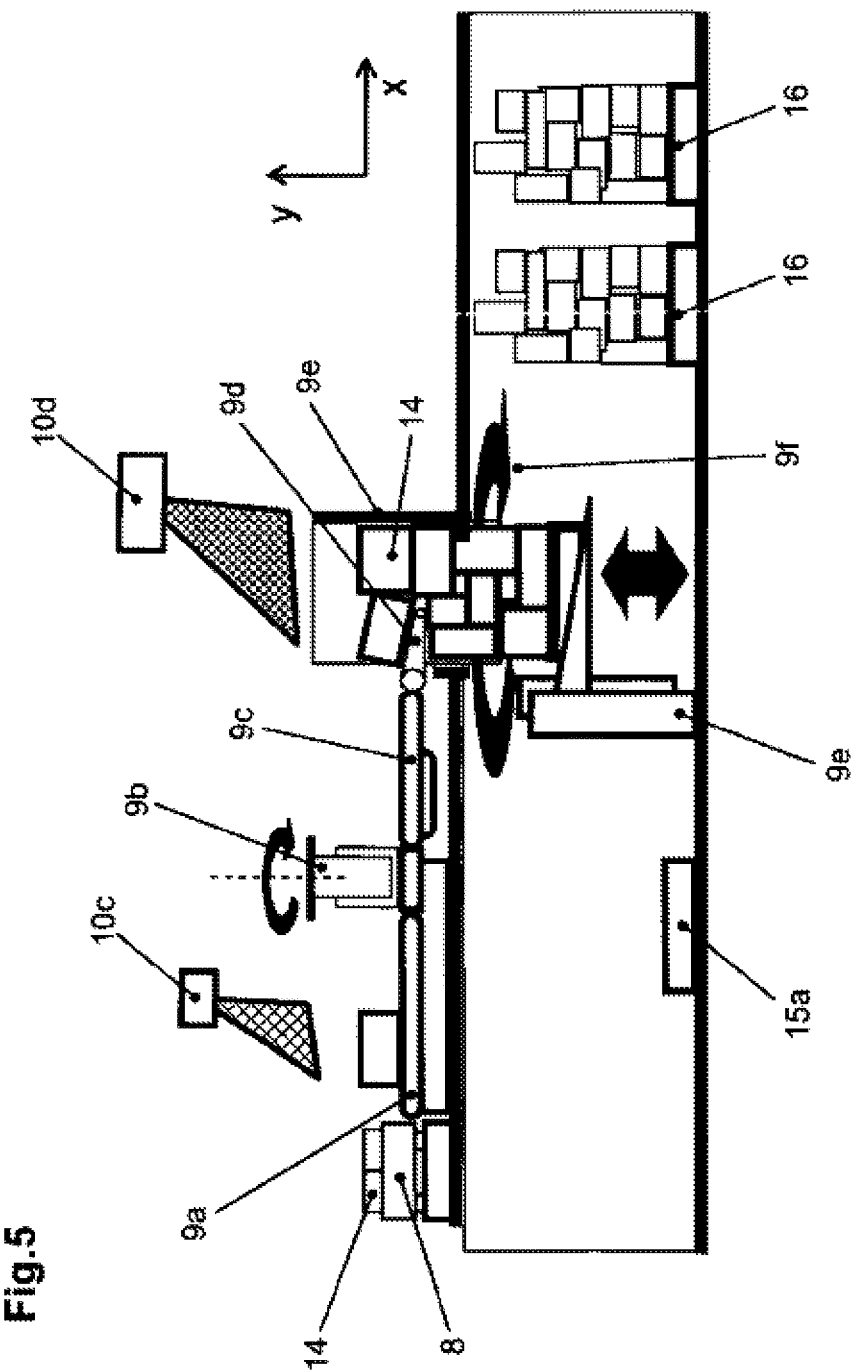
FIG. 5 shows a side view of a palletizing device with supply belts, rotary/pushing unit, palletizing head, palletizing shaft, telescopic lift and integrated pallet wrapper.

The automatic forming of store pallets requires a precalculation of the loading sequence; the latter has to be consistently maintained during the removal operation. The required sequence is achieved by skillful disposition of the transport shuttles (8), and of the lift units (6a, 6d), entry into the transport-rail loop and selection of the correct supply belt (9a) (see FIG. 5) of the palletizing station (9). As an additional option, the supply belts (9a) can be supplemented by a sequence function. The product units (14) therefore reach each palletizing device (9) in the predefined sequence.

The supply belts (9a) of the palletizing stations (9) are likewise equipped with a vision system (10c) which once again checks the correctness, intactness and orientation of the product units. A rotary/pushing unit (9b) for the correct rotation and displacement is correspondingly activated.

The supply to the palletizing device (9) is equipped with the rotary unit (9b) so that the product units (14) can be rotated into the precalculated position. The product units (14) are subsequently pushed onto a telescopic belt (9c) and advanced onto the top belt (9d) for placing on the store pallet.

The palletization takes place from the opposite position of a palletizing shaft (9e). By means of the arrangement of the elements, a continuous flow of high capacity with product units of differing size is ensured. The palletization operation is continuously monitored by a vision system (10d) which identifies deviations from the precalculated pallet pattern and correspondingly continuously calibrates the palletizer.

A pallet wrapper (9f) is integrated in the palletizing station. In accordance with the advancing of the palletizer, the pallet is lowered in small increments through the pallet shaft (9e) via the telescopic lift (9g) and wrapped. The loaded mixed pallets (16) are therefore secured for stable transport to the stores.

The finished mixed pallets (16) are subsequently supplied to the delivery region and delivered there according to store number. Subsequently, after an exit (12), the mixed pallets are loaded in trucks and transported to the stores.

Furthermore, a direct pallet flow (17) for full transport units (15) leads from the store (3) directly to a delivery zone (11). Furthermore, a path also leads to a manual region (13) in which the transport or product units can be handled manually.

The invention claimed is:

1. A method for storing or order-picking products, product units, or product unit groups in a storage or order-picking installation comprising a buffer store, the buffer store having a plurality of aisles, each aisle comprising storage, the method comprising:
   receiving the products, product units, or product unit groups from a depalletizing device;
   loading the products, product units, or product unit groups onto a transport shuttle by a loading on the transport shuttle, wherein said loading is performed by the transport shuttle following the depalletizing of the products by the depalletizing device;
   transporting the products, product units, or product unit groups on the transport shuttle onto a shuttle loop to the buffer store;
   prior to the loaded transport shuttle arriving at the buffer store, raising or lowering the loaded transport shuttle to different levels by a first lift unit that is upstream of the buffer store;
   upon reaching a desired level, moving the products, product units, or product unit groups by the transport shuttle into a storage location of the buffer store, or picking the products, product units, or product unit groups from a storage location, said products, product units, or product unit groups are moved along an aisle away from the first lift unit towards a reversing unit, said reversing unit is located at the end of an aisle;
   when the transport shuttle reaches the end of an aisle in the buffer store, reversing the transport shuttle by 180 degrees with the reversing unit and moving the transport shuttle from the current aisle to a next one of the aisles; and after storing or picking each of the products, product units, or product unit groups to or from the storage locations, moving the products, product units, or product unit groups to a second lift unit which is downstream of the buffer store while the products, product units, or product unit groups remain at least temporarily on the transport shuttle.

2. The method as claimed in claim 1, wherein the depalletizing device is equipped with a vision system, wherein a layer pattern and intermediate position of the products are identified and passed on through the depalletizing device for optimizing movement.

3. The method as claimed in claim 1, wherein the individual products, product units or product unit groups are combined into groups on a collecting belt.

4. The method as claimed in claim 1, wherein the products, product units or product unit groups are loaded in the loading device onto the transport shuttle with the aid of a conveyor belt of the transport shuttle and wherein the products, product units, or product unit groups are centered on the transport shuttle.

5. The method as claimed in claim 4, wherein the products, product units or product unit groups are transported into the buffer store by the transport shuttle.

6. The method as claimed in claim 1, wherein the products, product units or product unit groups are transported on a transport rail by the transport shuttle.

7. The method as claimed in claim 1, wherein the products, product units or product unit groups are transported together with the transport shuttle in a lift unit.

8. The method as claimed in claim 1, wherein a travel command of the transport shuttle is optimized such that, directly after a storage operation, the transport shuttle carries out a removal operation at a location in the storage or order-picking installation that is close to a storage-operation site.

9. The method as claimed in claim 8, wherein, during the removal operation, products, product units or product unit groups incrementally are placed by the storage and/or order-picking installation in the correct sequence, time of order placing at the transport shuttle, order sequence at the lift units, opening-up of the entry into the travel rail loop or order sequence at the rotary/pushing device.

10. The method as claimed in claim 9, wherein the products, product units or product unit groups are monitored while moving on the supply belt to the palletizing device by a vision system, said vision system serving to check the correctness, intactness and orientation of the arriving products, product units or product unit groups.

11. The method as claimed in claim 10, wherein the products, product units or product unit groups are moved onto a pallet in a predetermined sequence with the aid of a rotary or pushing device, a telescopic belt and a top belt.

12. The method as claimed in claim 11, wherein the loading operation of the palletizing device is continuously checked with a vision system, wherein deviations from the precalculated loaded image are identified and the palletizing device executes correspondingly corrected movements.

13. The method as claimed in claim 1, wherein the products, product units, or product unit groups are pushed or pulled by a depalletizing bar in the depalletizing device.

14. The method as claimed in claim 13, wherein a releasable connection between the depalletizing bar and the products, product units, or product unit groups is at least temporarily produced by at least one suction cup.

15. The method as claimed in claim 14, wherein the product, product unit or product unit group is raised by the depalletizing bar.

16. The method as claimed in claim 13, wherein, in the depalletizing device, a receiving belt is located under the product, product unit or product unit group.

17. The method as claimed in claim 13, wherein the product, product unit or product unit group is pushed or pulled onto a carry-away belt by the depalletizing bar.

18. The method claimed in claim 17, wherein the carry-away belt of the depalletizing device is equipped with a vision system, and said vision system identifies correctness, intactness and orientation of the products, product units or product unit groups.

19. The method as claimed in claim 18, wherein, during depalletization, the products, product units or product unit groups are supplied to the vision system and subsequently to a rotation unit or are rotated in the rotation unit.

20. A method for storing or order-picking products, product units, or product unit groups in a storage or order-picking installation, comprising a buffer store, wherein:

the buffer store has a plurality of aisles, a loaded transport shuttle is raised or lowered to different levels by a lift unit, said lift unit is upstream of the buffer store, the products, product units or product unit groups are moved into the buffer store by at least one transport shuttle away from the lift unit to a reversing unit at the end of an aisle, the transport shuttle is reversed by the reversing unit by 180 degrees to move from the aisle to a next one of the aisles, the products, product units or product unit groups are moved back to another lift unit and remain at least temporarily on the transport shuttle, the products, product units or product unit groups are retrieved from the buffer store by the transport shuttle or another transport shuttle at the another lift unit and the products, product units or product unit groups are moved along a transport rail or a shuttle loop to a palletizing device.

21. The method as claimed in claim 20, wherein the products, product units or product unit groups are supplied to the palletizing device via a supply belt and a rotary or pushing unit.

* * * * *